United States Patent [19]

Sündermann

[11] Patent Number: 5,778,937
[45] Date of Patent: Jul. 14, 1998

[54] METHOD OF MAKING LEAKPROOF SITES OF ENTRY OF DOMESTIC CONNECTOR PIPES AND SIMILAR FEED PIPES INTO SEWERS

[75] Inventor: Franz Sündermann, Ruprechtshofen, Austria

[73] Assignee: Klug Kanal-, Leitungs-und Umweltsanierungs- G.m.b.H., Ruprechtshofen, Austria

[21] Appl. No.: 700,474

[22] PCT Filed: Mar. 1, 1995

[86] PCT No.: PCT/AT95/00040

§ 371 Date: Aug. 29, 1996

§ 102(e) Date: Aug. 29, 1996

[87] PCT Pub. No.: WO95/23940

PCT Pub. Date: Sep. 8, 1995

[30] Foreign Application Priority Data

Mar. 1, 1994 [AT] Austria .................................. 431/94

[51] Int. Cl.$^6$ .................................................. F16L 55/16
[52] U.S. Cl. .................................................. 138/97; 138/98
[58] Field of Search ................................ 138/97, 98

[56] References Cited

U.S. PATENT DOCUMENTS 3,950,461  4/1976  Levens .......................... 138/97 X
4,029,428  6/1977  Levens .
4,245,970  1/1981  St. Onge ........................ 138/97 X

FOREIGN PATENT DOCUMENTS 0 253 588   1/1988   European Pat. Off. ........ F16L 55/00
2041147     9/1980   United Kingdom .................. 138/98
WO 87/05984 10/1987  WIPO .............................. F16L 55/18
WO 90/05874 5/1990   WIPO .............................. F16L 55/18
WO 91/08417 6/1991   WIPO .............................. F16L 55/16

*Primary Examiner*—William Stryjewski
*Attorney, Agent, or Firm*—Dougherty & Dremann

[57] ABSTRACT

A method for producing leak-proof sites of entry for domestic connection pipes and other feed pipes into sewers. The method includes the steps of widening the site of entry of the feed pipe into the sewer, providing a barrier towards the interior of the sewer at the site of entry, providing a barrier within the feed pipe at a predetermined distance from the site of entry, introducing an expanding solidifying sealing mass into the space between the barriers so as to fill the space and any openings, fissures, or cracks found therein, clearing a path of flow from the feed pipe through the sealing mass and into the sewer, and optionally lining the flow path with a solidifying, insoluble, corrosion-resistant and non-ageing material.

16 Claims, 8 Drawing Sheets

METHOD OF MAKING LEAKPROOF SITES OF ENTRY OF DOMESTIC CONNECTOR PIPES AND SIMILAR FEED PIPES INTO SEWERS

BACKGROUND OF THE INVENTION

1. Field of the Invention

The invention relates generally to construction, repair and modification of waste water drainage systems, and more particularly, to a method of making leak-proof sites of entry for domestic connection pipes and other feed pipes into waste water drainage systems.

2. Description of the Related Art

When constructing and renovating waste water drainage systems (e.g. sewers), it is very important that the sites of entry of feed pipes into a drainage system be leak-proof because leaking sewage can contaminate groundwater. Unfortunately, it is often very difficult to construct a leak-proof site of entry. For example, poor accessibility to the site of entry is a common problem in repairing or modifying a waste water drainage system. In most instances, drainage systems into which feed pipes enter, are not man-sized and generally are located below narrow streets with high traffic density. Traditional methods of repairing a drainage system or modifying a drainage system require excavating the area around the site of entry. The relatively high monetary costs of such earthwork are often increased by expenditures caused by traffic requirements, such as the provision of detours. Therefore, a need exists for a method to construct, repair and modify waste water drainage systems that avoids the costs associated with excavating the area around the site of entry and more importantly, provides a leak-proof site of entry that eliminates groundwater contamination from leaking sewage.

Various methods of making sites of entry of feed pipes into sewers have already been suggested. However, these methods insufficiently meet the object of providing well sealed sites of entry of the type discussed herein. For example, according to DE-A-37 00 883, in man-sized sewers which are provided with a lining made of bent plate elements, a hose-like, mortar-filled collar surrounding the site of entry is inserted between the sewer wall and the lining to form a leak-proof site of entry. The insertion of such a collar is hardly feasible if the sewer is not man-sized. Furthermore, it must be taken into account that the mortar filling of this hose-like collar will not permit this collar to snugly fit around all sealing sites, and thus leaks may still occur.

In EP-A1-403 773, annular or hose-shaped seals are provided between the inner pipe and the sewer wall at a site of entry of a lateral feed pipe in a sewer renovated with an inner pipe to avoid the penetration of waste-water coming from the feed pipe into the gap present between the sewer wall and the inner pipe. The insertion of such seals is difficult, and this technique requires that the pipe forming the lateral connection is fitted sufficiently leak-proof in the sewer wall. If such a leak-proof fit is not ensured, waste-water can leak into the surrounding soil.

EP-A1-350 802 describes a technique which provides for the insertion of an inner pipe into a main train of sewer pipes when renovating pipings into which feed ducts, e.g. from domestic connections, enter laterally, with the annular space formed between the original pipe wall and the inner pipe being filled with a mortar mass. At the sites of entry, apertures are formed starting from the interior of the inserted inner pipe by cutting through the wall of the inner pipe and the mortar layer, thereby forming a flow connection between the sites of entry and the main train of pipes. As a rule, the connection of the feed ducts with the main train of pipes remains in its original state and will not be changed even if moderate eccentricities occur when cutting out the apertures. Further, spraying a thin layer of artificial resin at the side faces of the transition may be considered. A thorough elimination of possible faults in the attachment of the feed ducts to the main train of pipes, however, is not provided for by this technique.

According to a further technique which is described in U.S. Pat. No. 4,728,223, after insertion of an inner pipe into the main train of pipes, apertures are cut into this inner pipe at those sites where the feed ducts enter into the main train of pipes. A filling element is then inserted into the feed ducts at the site of entry. This filling element projects into the interior of an inner pipe introduced into the main train of pipes. The filling element then places filler in the annular space between the inner pipe and the wall of the main train of pipes. However, treatment of the site of connection of the feed pipes with the main train of pipes which would repair any damage present in this region is not provided for by the technique.

Finally, a technique for renovating old sewers by inserting new inner pipes of synthetic material is described in U.S. Pat. No. 4,245,970. The region of entry of sewer branch pipes into the main sewer is filled with a filler by means of a nozzle passed through an inflatable sealing ring. Subsequently, an aperture for passage as far as necessary into the interior of the inner pipe is formed by a cutting tool. However, cavities, fissures or gaps which may be present at the site of entry often are only insufficiently sealed by this technique.

SUMMARY OF THE INVENTION

It is therefore an object of the present invention to provide a method of producing leak-proof sites of entry into waste water drainage systems.

Another object of the invention is to provide a method of constructing, repairing or modifying waste water drainage systems that avoids the monetary costs associated with traditional methods of constructing, repairing and modifying a site of entry.

It is another and more particular object of the invention to provide a method suitable both for constructing and renovating sites of entry, and for renovating feed pipes with an intact drainage system, and for carrying out such work in connection with the renovation of a drainage system by the insertion of an inner pipe into the drainage system.

The invention is a method for producing a leak-proof site of entry into a waste water drainage system in a manner that eliminates the need to excavate the drainage system and the site of entry. In the method, the edge of the site of entry into the drainage system (e.g. a sewer) is widened by forming a recess extending along the same edge. The site of entry is closed towards the interior of the sewer and from inside the feed pipe to form a space encompassing the site of entry. A solidifying, sealing mass is then introduced into the space formed at the site of entry. After the sealing mass sets, the flow path through the feed pipe and into the sewer is cleared of excess sealing mass. Preferably, a cover layer of solid or solidifying, insoluble, corrosion-resistant and non-ageing material is applied onto the inner face of the site of entry which is sealed by the sealing mass. In this manner, a leak-proof and strong connection can be made between domestic connection pipes and feed pipes entering into a waste water drainage system. Any damaged areas present in the region of the site of entry, such as broken out portions of pipe, transition gaps and fissures or similar damage, as well as faulty areas due to offsets between feed pipes and the entry apertures in the sewer wall, can be filled or repaired and replaced by the sealing mass, and thus renovated.

The invention also eliminates some of the problems associated with the precision required to renovate sewer connections. For example, a precise machining of the entry-side rim of the feed pipe corresponding to the curvature of the sewer wall prevailing at the site of entry is no longer necessary. Using the invention, it is possible to make this relatively complicated spacial intersection form automatically when removing the sealing mass, as is typically done in the course of clearing the flow path through the feed pipe into the sewer.

Another embodiment of the method of the invention includes inserting an inner pipe into the existing sewer. As an option, filler can be placed in the annular space between the inner pipe and the sewer. After placement of the inner pipe, and filler if desired, into the sewer, the site of entry is widened and sealed as described above. It should be noted that the cutting and widening of the site of entry may be effected both from the interior of the sewer or main train of pipes as well as from the pipe or feed pipe.

A variant to the last-mentioned embodiment of the invention includes introducing an inner pipe into the sewer wherein the diameter of the inner pipe is such that the inner pipe also forms a cover at the site of entry effectively closing off the interior of the sewer. The sealing mass is then introduced at the site of entry as previously described.

The invention can also be utilized in connecting new feed pipes to existing drainage systems. In this embodiment of the method, the feed pipe is brought up to the drainage system and a space is maintained between the connecting end of the feed pipe and the inner wall of the sewer. This space is bridged by introducing the solidifying sealing mass at the site of entry and removing the sealing mass present in the flow path of the feed pipe.

The method of the invention is particularly useful if an existing feed pipe is to be provided with an inner pipe. In this embodiment, an inner pipe of smaller diameter is placed into the existing feed pipe, thereby creating an annular space. A sealing mass is then introduced into the area of the site of entry. The sealing mass not only seals the site of entry but also flows into the annular space defined by the feed pipe and the inner pipe, thereby creating a stable and leak-proof connection.

Another embodiment of the method of the invention that provides improved mechanical stability and particularly good anchoring of the sealing mass utilizes a double-walled inner pipe wherein the two walls of the inner pipe are interconnected by a plurality of radially extending webs. The outer wall of the double-walled pipe is provided with apertures in the area around the site of entry, or is removed, and preferably is only partially removed, so that when the sealing mass is introduced at the site of entry, the sealing mass is also guided between the webs and to the inner wall of the double-walled pipe.

DESCRIPTION OF PREFERRED EMBODIMENTS

Figure 1A:
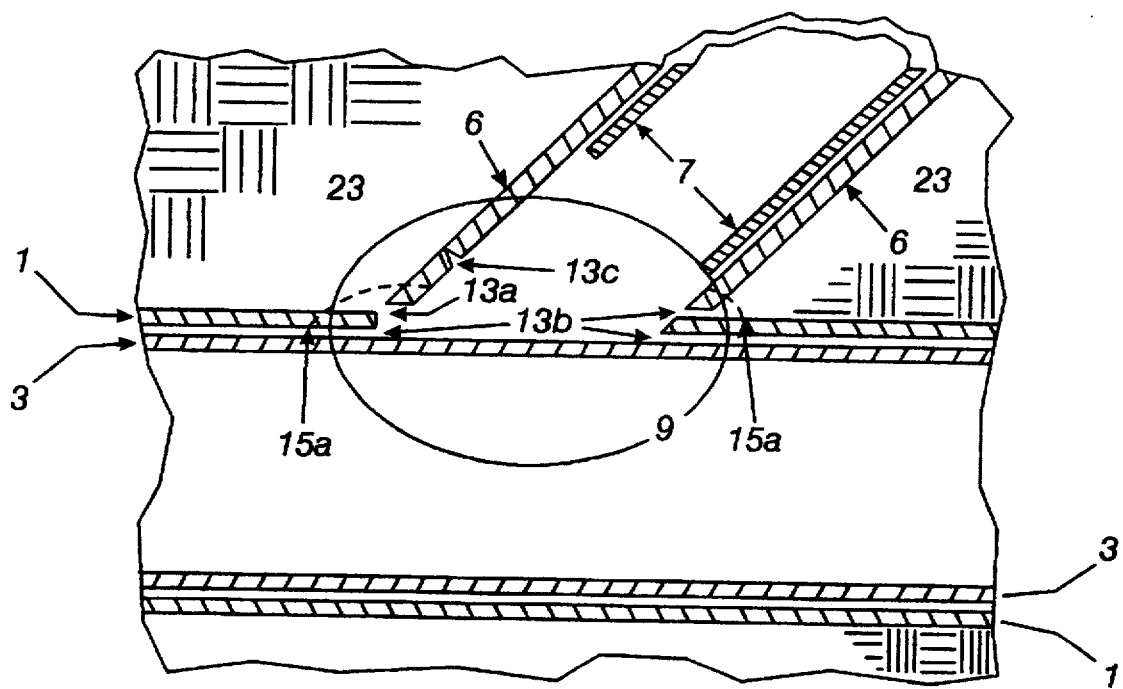
FIG. 1a is a longitudinal cross-section of a connection between a feed pipe and a sewer.

The invention will now be further explained with reference to examples illustrated in the accompanying figures.

FIGS. 1–5 are longitudinal cross-sections showing various feed pipe connections into drainage systems. FIGS. 1a–1c illustrate one embodiment of the invention. In FIG. 1a, a sewer 1 extends in the soil 23. A feed pipe 6 discharges into the sewer 1 in the region of the site of entry 9. As an aid to understanding the usefulness of the invention, the site of entry 9 has been drawn to include various types of damage, such as broken out portions 13a, transition gaps 13b and fissures 13c. To repair the damage present at the site of entry, a sewer inner pipe 3 is introduced into the sewer 1, and a feed inner pipe 7 is introduced into the feed pipe 6. The edge of the site of entry of the pipe 6 is widened by forming a recess 15a indicated by the phantom line. By forming the recess, broken out portions, gaps and fissures present at the site of entry 9 are largely removed. The forming of recess 15a can be accomplished using a milling robot or similar cutting device introduced via the feed pipe 6.

Preferably, the feed inner pipe 7 is not guided all the way to the interior of the sewer 1. A space is maintained between the connecting end of the pipe 7 and the wall of the sewer inner pipe 3. As shown in FIG. 1b, an injection device 16 comprising a feed duct 18 and an injection nozzle 19 is introduced via the feed inner pipe 7. The inner space of the pipe 7 is closed externally of the site of entry 9 by a radially expandable disc 17 which is in contact with the injection device 16. Sewer inner pipe 3 present in sewer 1 forms a cover closing the site of entry 9 at the inner side of the wall of the sewer 1 creating a space that encompasses the site of entry and is defined by the outer wall of sewer inner pipe 3 and the disc 17. A pressure-proof, leak-proof connection of feed pipe 6 to sewer 1 is then created by introducing a sealing mass 12. The sealing mass 12 is introduced into the defined space in a sufficient amount and at sufficient pressure to fill the entire defined space including the recess 15a and all fissures and cracks located therein (e.g. 13a, 13b, 13c).

Figure 1B:
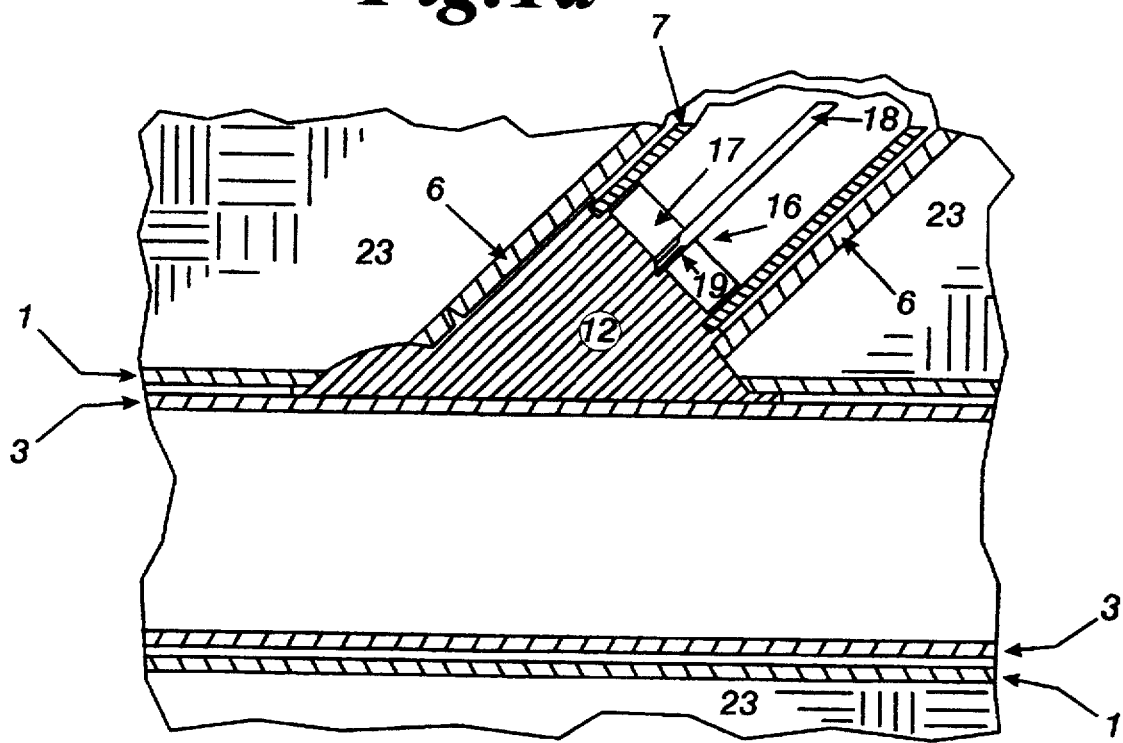
FIG. 1b is a longitudinal cross-section of the connection of FIG. 1a after placement of a sealing mass at the point of entry of the feed pipe into the sewer.
Figure 1C:
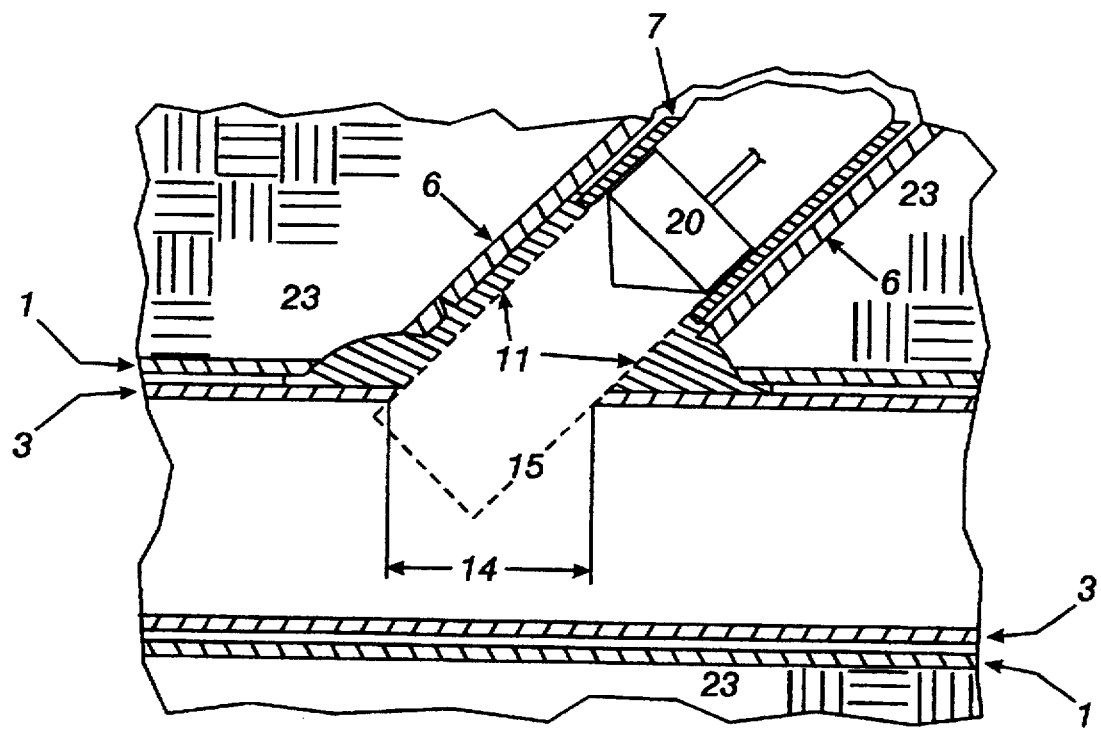
FIG. 1c is a longitudinal cross-section of the connection of FIG. 1b after the removal of the sealing mass from the path of flow.

As shown in FIG. 1c, after the sealing mass 12 is solidified, a milling device 20 or other appropriate milling, drilling or cutting device is used to remove sealing mass corresponding to the inner diameter of the pipe 7 to clear a flow path for the feed pipe 6 into the sewer 1. The milling, drilling or cutting device 20 is advanced at the site of entry through the feed inner pipe 7 into the interior of the sewer 1, and the solidified sealing mass is removed according to the cylinder shape 15 shown in broken lines.

The sewer inner pipe 3, whose wall is still completely closed at the site of entry 9 at the time the sealing mass 12 is introduced, is partly removed or cut out in registration with the inner space of the feed inner pipe 7, together with the sealing mass present in the flow path of the pipe 6. Thus, a pressureproof, leak-proof connection 11 is formed which consists of the remaining solidified sealing mass 12 and extends from the connecting end of the feed inner pipe 7 into the interior of the sewer 1. In this manner, an automatic adaptation of the edge shape of the feed duct formed with the feed inner pipe 7 to the circumferential shape of the sewer 1 is achieved, thus eliminating a complex processing of the connecting end of the feed inner pipe 7.

In the embodiment of the method according to FIGS. 1a–1c, the external diameter of the feed inner pipe 7 is only slightly smaller than the internal diameter of the feed pipe 6, and the annular gap present between these feed pipes 6 and 7 is sealed by the sealing mass 12 entering into this annular gap. The sealing mass 12 can also fill gaps present between the wall of the sewer 1 and the sewer inner pipe 3 inserted into the sewer 1.

The penetration of the sealing mass into the branches of the cavities present at the site of entry 9 may be controlled by selection of the injection pressure as well as by selection of the composition of the sealing mass. Expanding sealing masses are advantageous. A sealing mass in the form of a two-component synthetic resin foam that hardens in the presence of moisture, that displaces water and that quickly solidifies is particularly preferred. A polyurethane foam that swells and thus "crawls" is particularly suitable. Such a foam will even enter into gaps of 0.1 mm width and harden to a material of considerable static strength. It is advantageous to choose a type of foam material which is non-ageing, waterproof, and resistant to domestic chemicals as well as to chemical aggression by substances present in the soil. A swelling polyurethane foam strongly contacts surfaces delimiting the foam body and thus prevents the entry of water at the areas of contact while simultaneously providing a certain degree of elasticity so that minor movements can be accommodated without substantially affecting the leak-proof contact of the foam. Such properties can also be attained with other suitable materials.

The closure of the interior of the feed pipe 6, can be accomplished in various ways. An inflatable balloon or a similar closing device can be provided on the injection device 16 instead of a radially expandable disc 17. An inflatable balloon may offer advantages, because it may be guided easily through narrow passages.

Figure 2A:
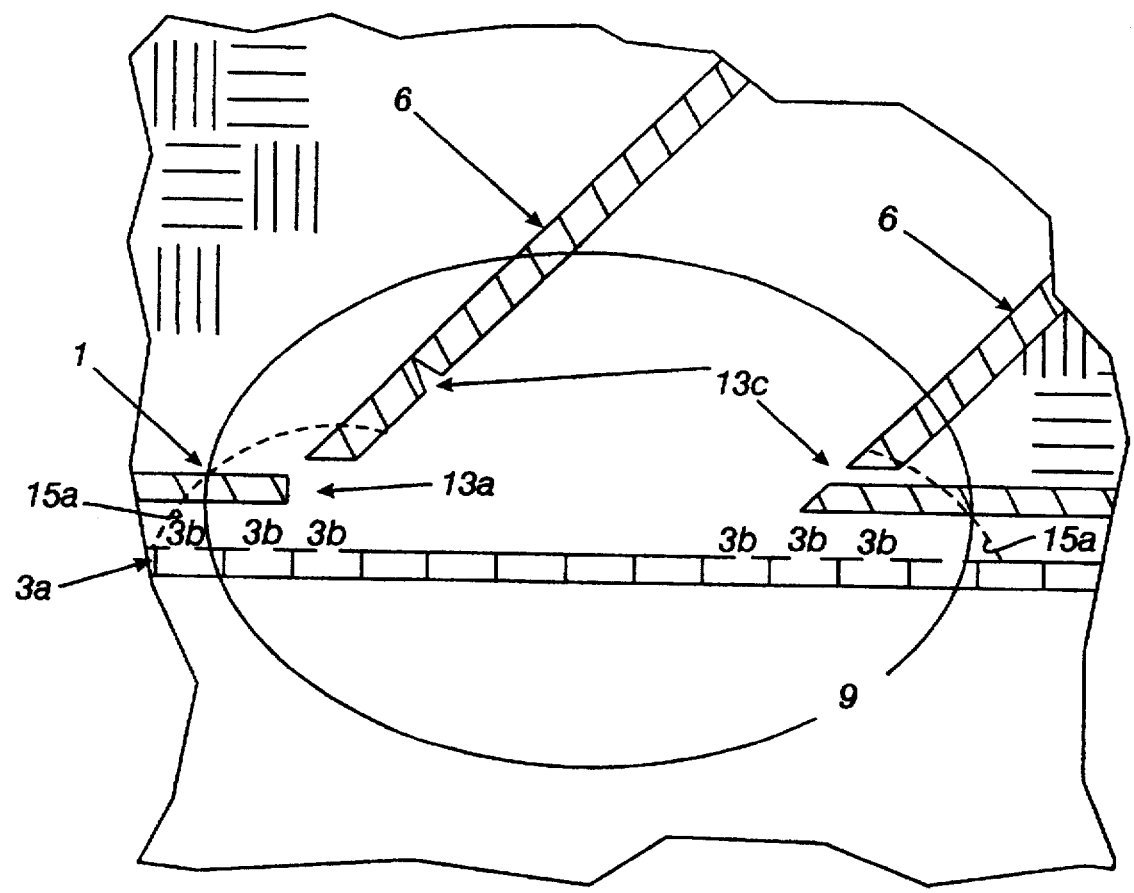
FIG. 2a is a longitudinal cross-section of a connection between a feed pipe and a sewer which utilizes a double-walled inner pipe within the sewer.
Figure 2B:
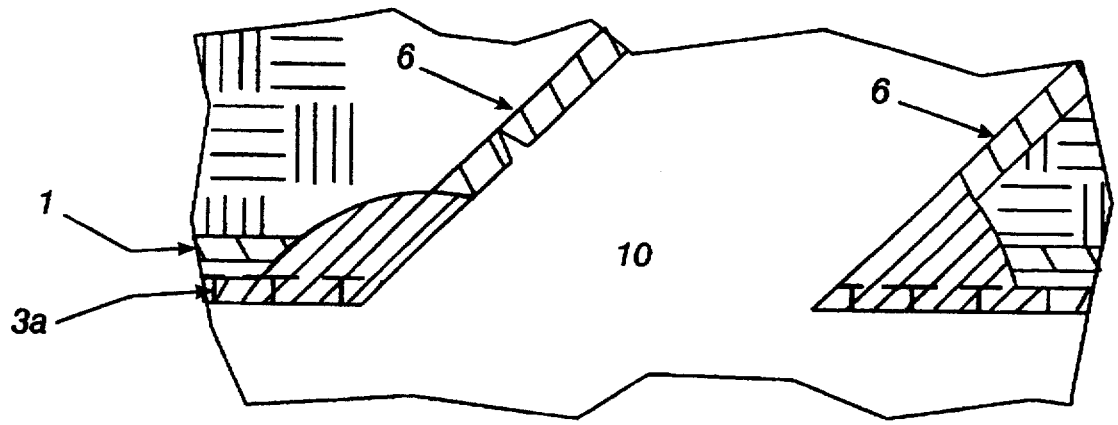
FIG. 2b is a longitudinal cross-section of the connection of FIG. 2a after removal of a sealing mass from the path of flow.

FIGS. 2a and 2b illustrate another embodiment of the method. In this embodiment, recess 15a is again formed at the site of entry 9. A double-walled sewer inner pipe 3a is introduced into the sewer 1 to be renovated. The two walls of pipe 3a are interconnected by a plurality of radially extending webs so that the wall of this pipe 3a, seen as a whole, is formed of a large number of mutually closed compartments. A pipe having such a structure has a good mechanical stability with relatively low weight and offers increased safety against undesired wall perforations. In the region of the site of entry 9, the outer wall of this double-walled pipe 3a is provided with apertures 3b or is partly removed. The sealing mass introduced in the course of the process into the cavities present at the site of entry 9 can enter into the compartments of pipe 3a opened by the apertures 3b and thus can anchor itself well in pipe 3a as illustrated in FIG. 2b. The slit-shaped apertures 3b may be made before introducing the sewer inner pipe 3a into the sewer 1, or they may be made when the inner pipe 3a is already in place by means of a correspondingly controlled milling robot introduced via the feed pipe 6. The cavities at the site of entry 9 are filled as previously described. When the sealing mass has solidified, the flow path can be cleared using a milling device or other clearing device as previously described. Thus, the leak-proof site of entry 10 of the feed pipe 6 into the sewer 1 and its sewer inner pipe 3a is formed, as illustrated in FIG. 2b.

In an alternative embodiment of the method illustrated in FIGS. 2a and 2b, a double walled pipe may be used for the feed inner pipe 7. Sealing along such a pipe 7 would be in the same manner as that shown for sewer inner pipe 3a in FIG. 2b. Such a double-walled design of a feed inner pipe 7 offers the advantage of a very stable anchoring of the connecting end of the feed pipe to the sealing mass.

Figure 3A:
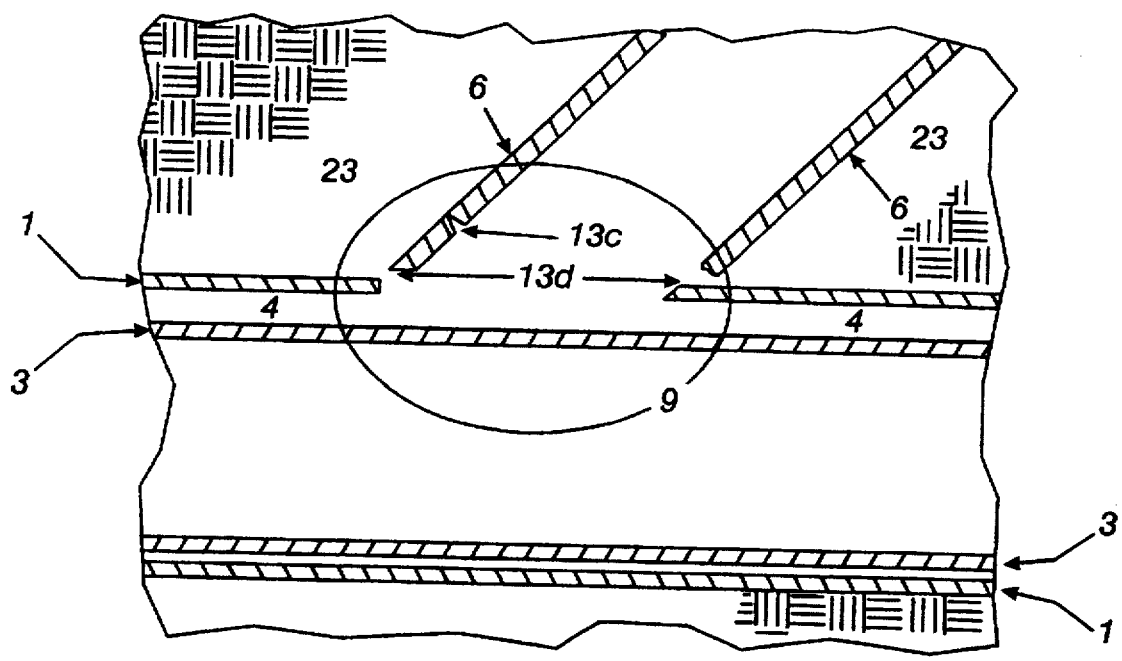
FIG. 3a is a longitudinal cross-section of an alternative connection between a feed pipe and a sewer.
Figure 3B:
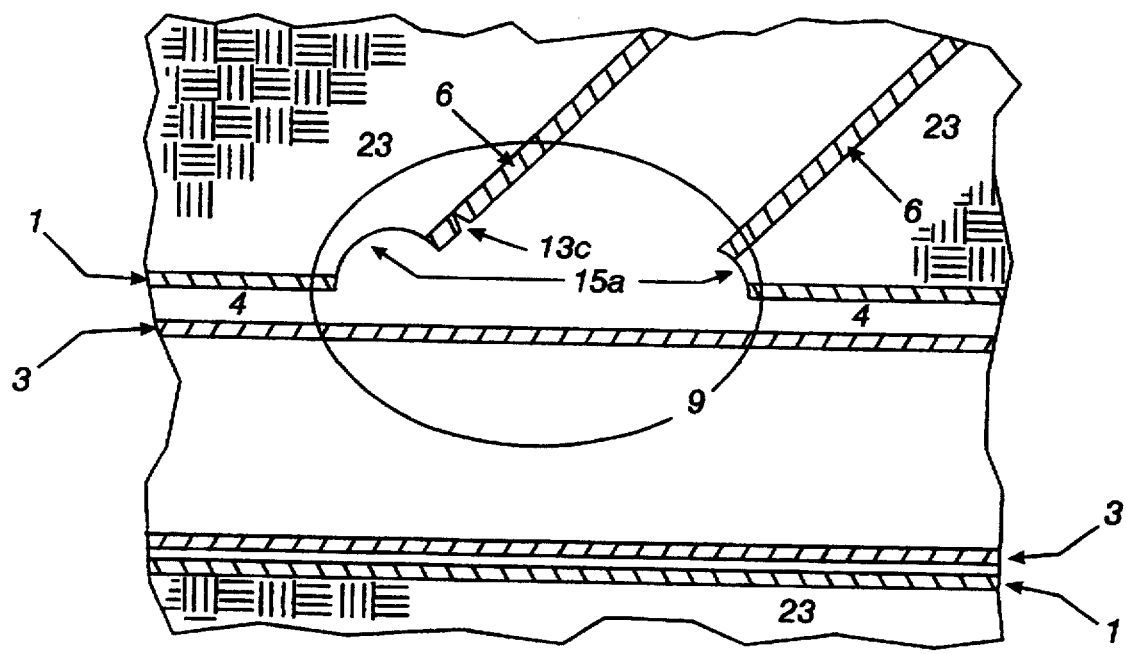
FIG. 3b is longitudinal cross-section of the connection of FIG. 3a showing a recess formed at the site of entry.
Figure 3C:
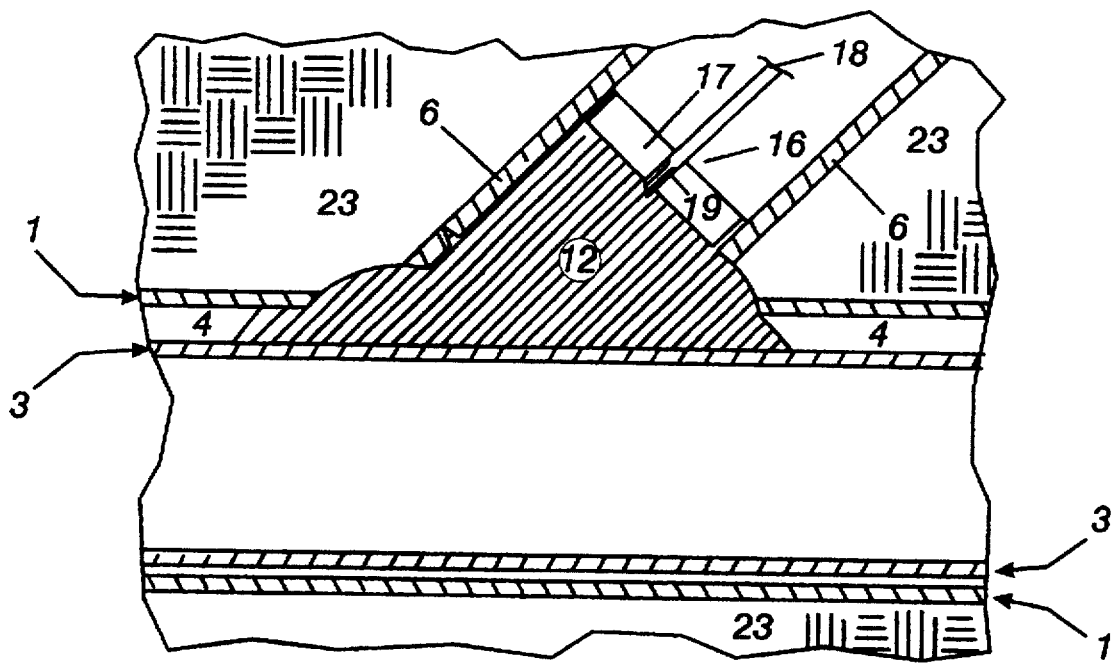
FIG. 3c is a longitudinal cross-section of the connection of FIG. 3b after placement of a sealing mass at the site of entry.

FIGS. 3a–3d illustrate yet another embodiment of the method. At the site of entry 9, the edge of the entry is provided with a recess 15a (FIG. 3b). Again, damaged parts which have an unfavorable shape for the penetration of the sealing mass, (e.g. narrow slits and the cavities there behind, or lateral offsets 13d of the feed pipe 6) can be removed by this recess. The recess 15a is again made by a milling robot introduced via the feed pipe 6.

The embodiment illustrated in FIGS. 3a–3d show that even with a sewer inner pipe 3 of markedly smaller diameter as compared to the diameter of the sewer 1, this inner pipe 3 can form a cover closing the site of entry 9 at the inner side of the sewer wall, without requiring filling of the annular space 4 there between with a filler. Such an embodiment will be suitable if both the sewer 1 and the sewer inner pipe 3 have sufficient static stability or strength. When the sealing mass 12 is introduced by means of the injection device 16 inserted via the feed pipe 6 (FIG. 3c), the cavities located in the region of the site of entry 9, the recess 15a and the annular space 4 in the region of the site of entry 9 are filled with the sealing mass. The distance passed by the sealing mass 12 into the annular space 4 can be adjusted by appropriate adjustment of the flow or solidifying parameters of the sealing mass 12 or by adjusting the injection pressure. The sealing mass 12 flowing into the annular space 4 at the site of entry 9 provides a support for the sewer inner pipe 3 in the sewer 1.

Figure 3D:
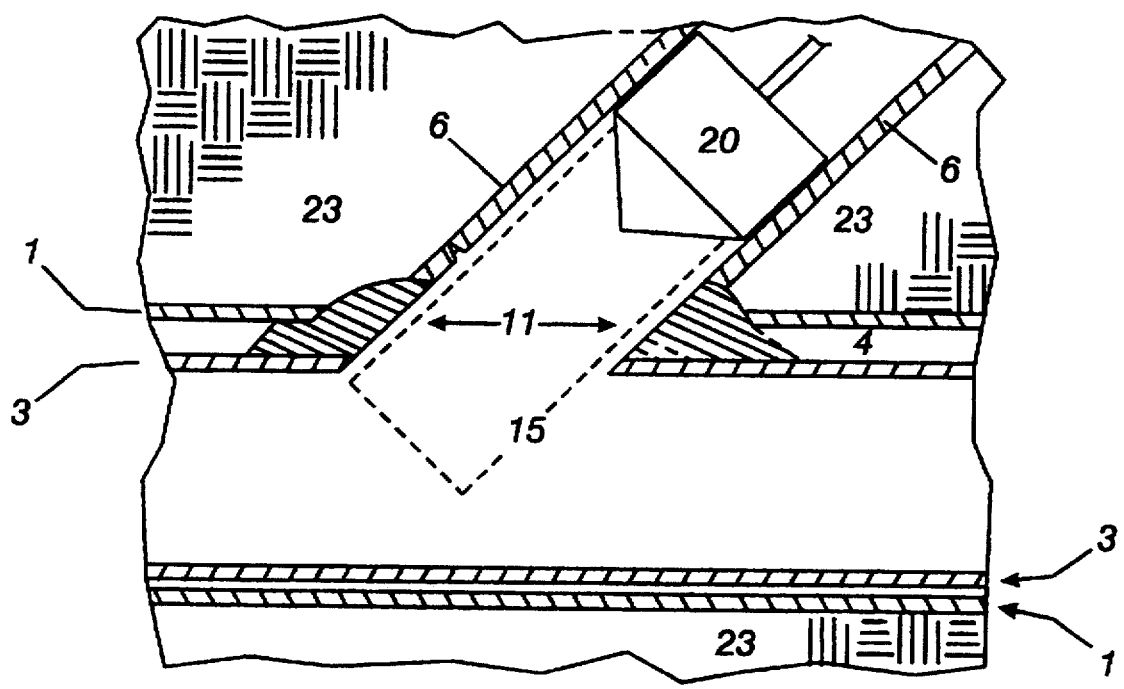
FIG. 3d is a longitudinal cross-section of the connection of FIG. 3c after removal of the sealing mass from the path of flow.

Subsequently, as shown in FIG. 3d, the flow path from the feed pipe 6 into the sewer 1 and the sewer inner pipe 3, can be cleared by an appropriate clearing device 20 forming a cylindrical cut-out 15. Thus, a pressure-proof, leak-proof connection of the feed pipe 6 with the sewer inner pipe 3 of the sewer 1 is formed, as schematically illustrated in FIG. 3d. It should be pointed out that in this finished state, the entry aperture formed in the sewer inner pipe 3 registers with the feed pipe 6. The originally present lateral offset is eliminated. If desired, a feed inner pipe 7 may also be used as shown in FIG. 1a.

The process may be modified in that the recess 15a can be formed before a sewer inner pipe 3 is introduced into sewer 1. Likewise, if desired, the annular space 4 between the wall of the sewer 1 and the sewer inner pipe 3 may be filled with a filler before the sealing mass is introduced into the cavities present at the site of entry 9.

Figure 4C:
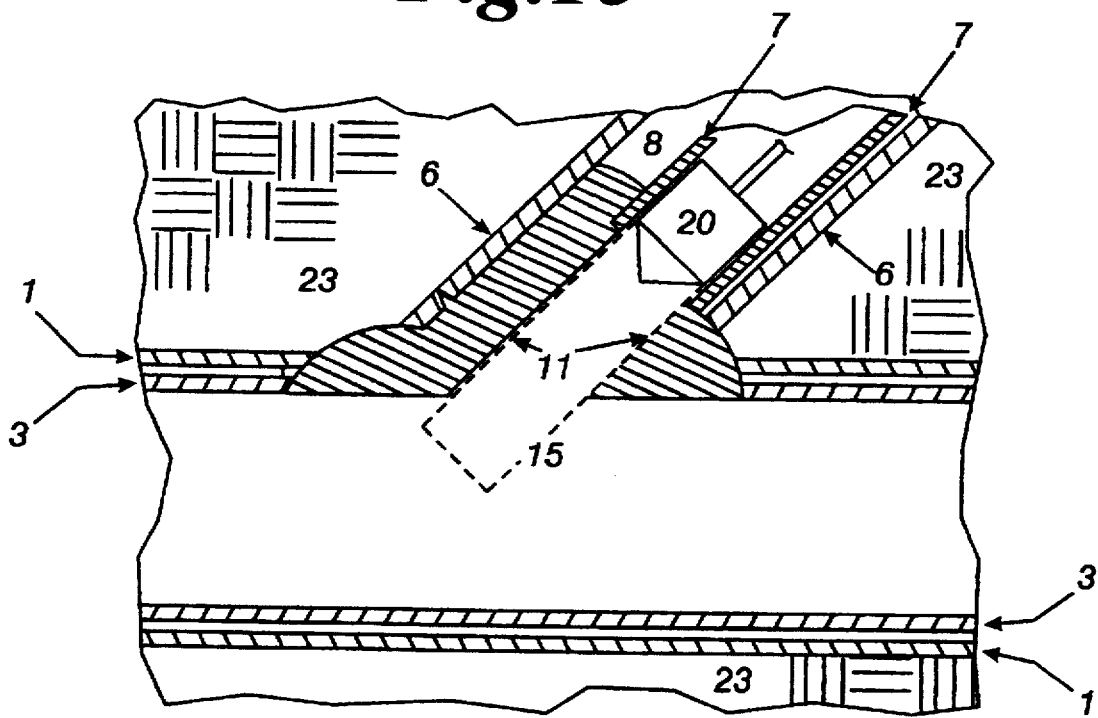
FIG. 4c is a longitudinal cross-section of the connection of FIG. 3b after the removal of the sealing mass from the path of flow.
Figure 4A:
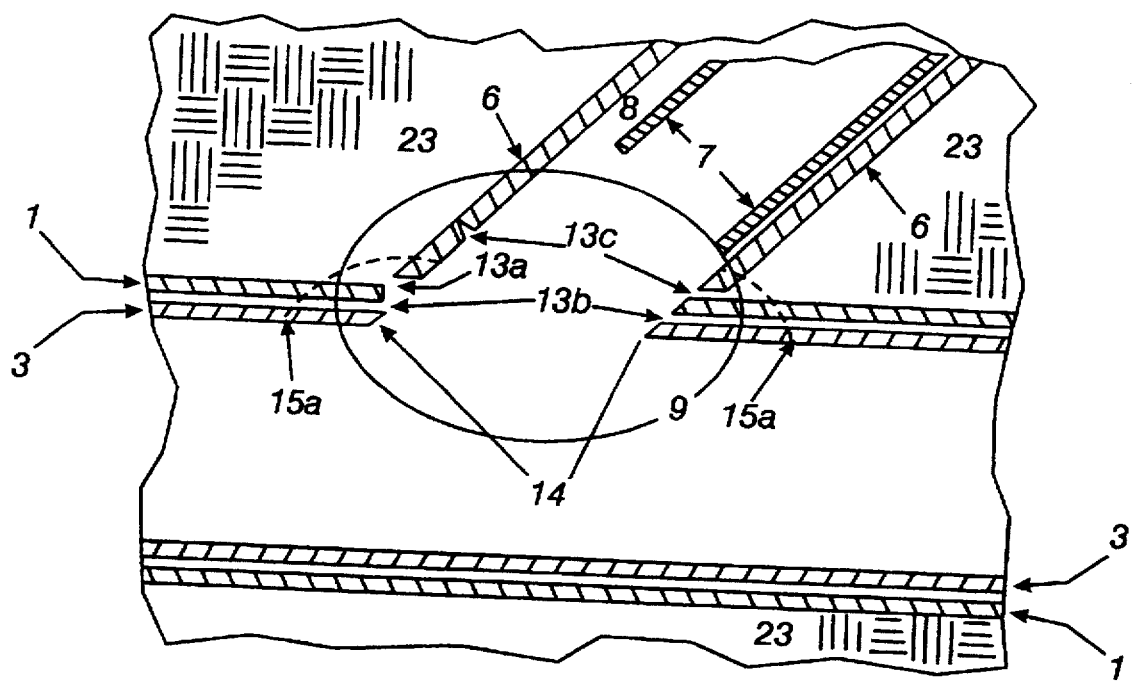
FIG. 4a is a longitudinal cross-section of an alternative connection between a feed pipe and a sewer.
Figure 4B:
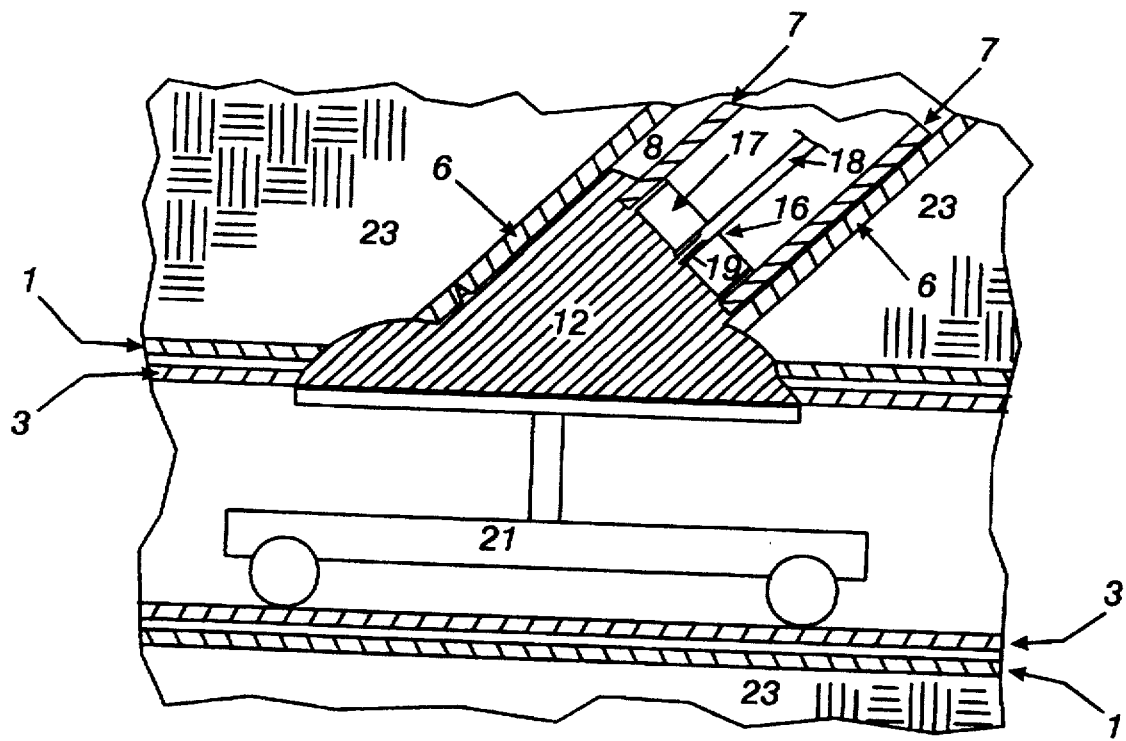
FIG. 4b is a longitudinal cross-section of the connection of FIG. 4a after placement of a sealing mass at the site of entry.

Yet another embodiment of the method is illustrated in FIGS. 4a–4c. These figures relate to the renovation of a sewer 1 that has been previously renovated by introduction of a sewer inner pipe 3. At the entry aperture 10 to which the feed pipe 6 is joined, the sewer inner pipe 3 is provided with an entry aperture 14 as shown in FIG. 4a. Damaged portions, (broken out portions 13a, transition gaps 13b and fissures 13c) may be present in the region of the site of entry 9, which require repair. As with the previous embodiments, a recess 15a is formed by widening the site of entry 9. This recess extends to the sewer inner pipe 3.

Furthermore, in this embodiment the feed pipe 6 is to be renovated by insertion of a feed inner pipe 7. The feed inner pipe 7 has a substantially smaller diameter than the feed pipe 6 so that there remains an annular space 8 between these two pipes. As shown in FIG. 4b, the aperture 14 is closed towards the sewer interior by a cover 21. The feed inner pipe 7 is closed by a closing device 17 provided on an injection device 16 supplied via the feed inner pipe 7. Subsequently, sealing mass 12 is introduced by the injection device 16 into the cavities located in the region of the site of entry 9. As shown in FIG. 4c, when the sealing mass has solidified, the cover 21 and the injection device 16 including the closing device 17 are removed, and a milling device 20 is introduced via the feed inner pipe 7 to clear a path of flow from feed inner pipe 7 through the solidified mass and into sewer inner pipe 3. This path of flow is illustrated by broken lines 15 in FIG. 4c.

In yet another embodiment of the method, some stages of which are illustrated in FIGS. 5a–5d, a defective site of entry of a feed pipe 6 into a sewer 1 previously renovated by installation of a sewer inner pipe 3 is repaired so that a leak-proof entry of the feed pipe 6 into sewer 1 or the sewer inner pipe 3 is formed. The sewer inner pipe 3 provided for lining sewer 1 in this instance has a markedly smaller external diameter than the diameter of the inner wall of the sewer 1. The annular space 4 between the outer side of the sewer inner pipe 3 and the inner side of the sewer 1 is filled with a filler 5 (i.e. "closed by a dam", as this is called in the art).

Figure 5A:
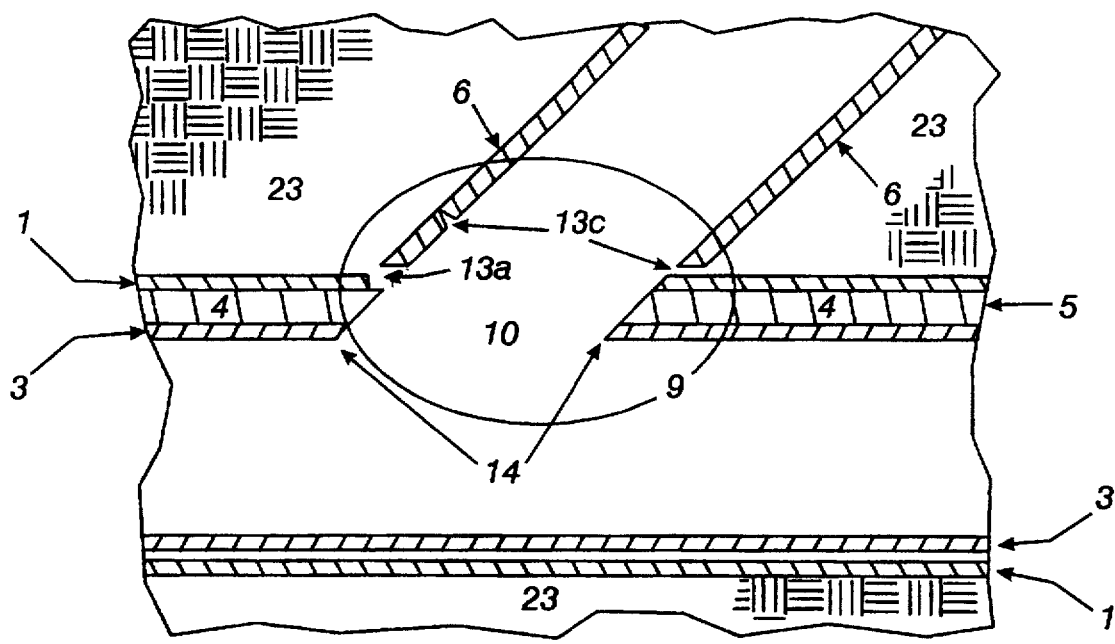
FIG. 5a is a longitudinal cross-section of an alternative connection between a feed pipe and a sewer.
Figure 5B:
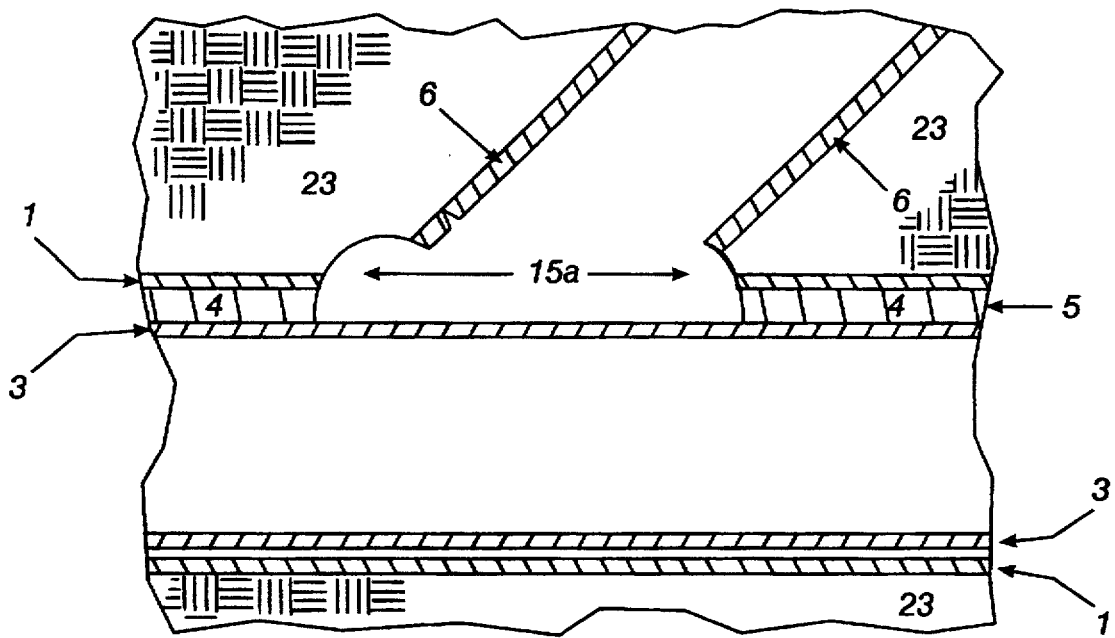
FIG. 5b is a longitudinal cross-section of the connection of FIG. 5a showing a recess formed at the site of entry.
Figure 5C:
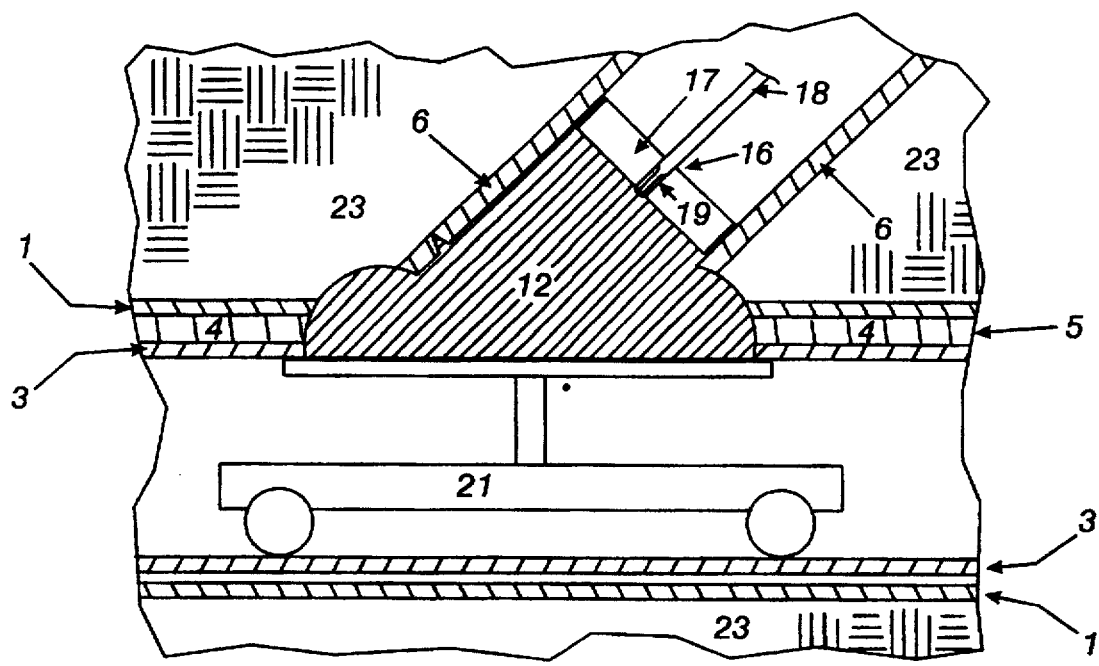
FIG. 5c is a longitudinal cross-section of the connection of FIG. 5b after placement of a sealing mass at the site of entry.
Figure 5D:
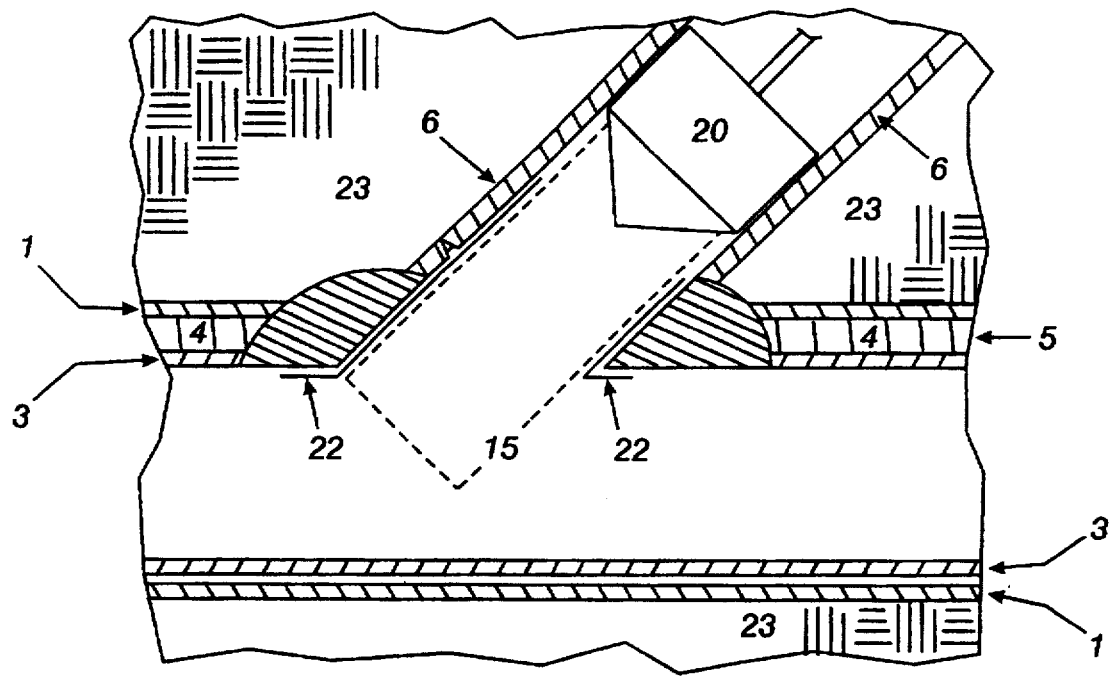
FIG. 5d is a longitudinal cross-section of the connection of FIG. 5c after removal of the sealing mass from the path of flow.

In this embodiment, the edge of the entry aperture 10 provided in the sewer wall is widened by forming a recess 15a, as shown in FIG. 5b, whereby part of the damaged portions, (e.g. broken out portions 13a and fissures 13c) are removed. Simultaneously, the aperture 14 in the inner pipe is widened and the filler 5 present there is removed. Subsequently, the cavity located in the region of the site of entry 9 is covered towards the interior of the inner pipe 3 by a covering device 21 (FIG. 5a), and the feed pipe 6 is closed towards its feed side by a closing device 17. The closed cavity is then filled with a sealing mass 12 by an injection device 16 comprising a feed duct 18 and an injection nozzle 19. The sealing mass 12 fills the recess 15a and any damaged portions that might have remained. The edge of the filler 5 facing the site of entry and located in the annular space 4 between the sewer wall and the sewer inner pipe 3, is covered by the sealing mass 12, and thus is protected from a corrosive attack by waste water. When the sealing mass 12 has solidified, the cover device 21, the injection device 16 and the closing device 17 are removed. A cut-out 15 indicated by the broken lines in FIG. 5d is then formed by a milling device 20 or other suitable cutting device that removes the sealing mass 12 located in the flow path from the feed pipe 6 to the sewer inner pipe 3. In this manner a leak-proof entry is created from the feed pipe 6 into the sewer inner pipe 3.

If particularly good corrosion resistance and non-ageing properties are desired for the pipe wall surfaces remaining at the site of entry and lying in the flow path of the waste water and if an appropriate material for the sealing mass cannot be used, (e.g., because the sealing mass has to meet other requirements, such as a very good deformability) it is possible, as is illustrated in FIG. 5d, to apply a cover layer 22 of solid or solidifying, insoluble, corrosion-resistant and non-ageing material to the inner face of the entry. This applies equally as well to all of the embodiments of the method described herein.

I claim:

1. A method for producing a leak-proof site of entry for a feed pipe into a sewer, the method comprising the steps of:
   (a) widening the site of entry by forming a recess in the vicinity of the site of entry;
   (b) providing a barrier towards the interior of the sewer at the site of entry;
   (c) providing a barrier within the feed pipe at a predetermined distance from the site of entry;
   (d) introducing an expanding solidifying sealing mass between the barrier towards the interior of the sewer and the barrier within the feed pipe; and
   (e) clearing a path of flow through the feed pipe into the sewer.

2. A method according to claim 1 wherein the step (b) of providing a barrier towards the interior of the sewer at the site of entry comprises the step of inserting a sewer inner pipe into the sewer.

3. A method according to claim 2 wherein the step (b) of providing a barrier towards the interior of the sewer at the site of entry comprises the further step of placing a filler into the annular space between the sewer inner pipe and the sewer wall.

4. A method according to claim 1 comprising the further steps of:
   (a1) inserting a feed inner pipe into the feed pipe; and
   (a2) maintaining a space between the end of the feed inner pipe adjacent the site of entry and the inner wall of the sewer.

5. A method according to claim 4 wherein the step (b) of providing a barrier towards the interior of the sewer at the site of entry comprises the step of inserting a sewer inner pipe into the sewer.

6. A method according to claim 5 wherein the step (b) of providing a barrier towards the interior of the sewer at the site of entry comprises the further step of placing a filler into the annular space between the sewer inner pipe and the sewer wall.

7. A method according to claim 1 wherein the step (b) of providing a barrier towards the interior of the sewer at the site of entry comprises inserting a double-walled sewer inner pipe having an inner wall and an outer wall defining an annular space therebetween and interconnected by a plurality of radially extending webs, the outer wall being provided with apertures in the vicinity of the site of entry so that the expanding solidifying sealing mass will be introduced into the annular space defined by the inner wall and the outer wall.

8. A method according to claim 1 comprising the further step (f) of lining the path of flow through the feed pipe into the sewer with a solidifying, insoluble, corrosion-resistant and non-ageing material.

9. A method for producing a leak-proof site of entry for a feed pipe into a sewer, the method comprising the steps of:

(a) placing the feed pipe in close proximity to the sewer;

(b) maintaining a space between the end of the feed pipe adjacent the site of entry and the inner wall of the sewer;

(c) widening the site of entry by forming a recess in the vicinity of the site of entry;

(d) providing a barrier towards the interior of the sewer at the site of entry;

(e) providing a barrier within the feed pipe at a predetermined distance from the site of entry;

(f) introducing an expanding solidifying sealing mass between the barrier towards the interior of the sewer and the barrier within the feed pipe; and (g) clearing a path of flow through the feed pipe into the sewer.

10. A method according to claim 9 wherein the step (d), of providing a barrier towards the interior of the sewer at the site of entry comprises the step of inserting a sewer inner pipe into the sewer.

11. A method according to claim 10 wherein the step (d) of providing a barrier towards the interior of the sewer at the site of entry comprises the further step of placing a filler into the annular space between the sewer inner pipe and the sewer wall.

12. A method according to claim 9 comprising the further steps:

(c1) inserting a feed inner pipe into the feed pipe; and (c2) maintaining a space between the end of the feed inner pipe adjacent the site of entry and the inner wall of the sewer.

13. A method according to claim 12 wherein the step (d) of providing a barrier towards the interior of the sewer at the site of entry comprises the step of inserting a sewer inner pipe into the sewer.

14. A method according to claim 13 wherein the step (d) of providing a barrier towards the interior of the sewer at the site of entry comprises the further step of placing a filler into the annular space between the sewer inner pipe and the sewer wall.

15. A method according to claim 9 wherein the step (d) of providing a barrier towards the interior of the sewer at the site of entry comprises inserting a double-walled sewer inner pipe having an inner wall and an outer wall defining an annular space therebetween and interconnected by a plurality of radially extending webs, the outer wall being provided with apertures in the vicinity of the site of entry so that the expanding solidifying sealing mass will be introduced into the annular space defined by the inner wall and the outer wall.

16. A method according to claim 9 comprising the further step (h) of lining the path of flow through the feed pipe into the sewer with a solidifying, insoluble, corrosion-resistant and non-ageing material.

* * * * *